US009564633B2

United States Patent
Chan et al.

(10) Patent No.: US 9,564,633 B2
(45) Date of Patent: Feb. 7, 2017

(54) HYBRID SILICON AND CARBON CLATHRATES

(71) Applicant: Southwest Research Institute, San Antonio, TX (US)

(72) Inventors: Kwai S. Chan, San Antonio, TX (US); Michael A. Miller, San Antonio, TX (US)

(73) Assignee: SOUTHWEST RESEARCH INSTITUTE, San Antonio, TX (US)

( * ) Notice: Subject to any disclaimer, the term of this patent is extended or adjusted under 35 U.S.C. 154(b) by 65 days.

(21) Appl. No.: 13/924,949

(22) Filed: Jun. 24, 2013

(65) Prior Publication Data

US 2014/0374673 A1 Dec. 25, 2014

(51) Int. Cl.
*H01M 4/38* (2006.01)
*H01M 4/36* (2006.01)
*H01M 4/134* (2010.01)

(52) U.S. Cl.
CPC ............ *H01M 4/386* (2013.01); *H01M 4/362* (2013.01); *H01M 4/134* (2013.01)

(58) Field of Classification Search
CPC ......... C01B 33/06; C01B 33/021; H01B 1/02; H01M 4/134; H01M 4/387
USPC .................................. 252/182.1; 429/218.1
See application file for complete search history.

(56) References Cited

U.S. PATENT DOCUMENTS

| 5,800,794 | A  | 9/1998  | Tanigaki et al. |
| 6,188,011 | B1 | 2/2001  | Nolas et al. |
| 6,423,286 | B1 | 7/2002  | Gryko |
| 6,461,581 | B1 | 10/2002 | Eguchi et al. |
| 6,525,260 | B2 | 2/2003  | Yamashita et al. |
| 6,797,199 | B2 | 9/2004  | Eguchi et al. |
| 7,534,414 | B2 | 5/2009  | Nolas et al. |
| 8,722,247 | B2 | 5/2014  | Miller et al. |
| 8,906,551 | B2 | 12/2014 | Chan et al. |
| 8,968,929 | B2 | 3/2015  | Chan et al. |

(Continued)

FOREIGN PATENT DOCUMENTS

| JP | 09-194206 | * | 7/1997 | ............ C01B 33/00 |
| JP | 2009-170287 | * | 7/2009 | ............ H01M 4/02 |
| WO | 2013158307 A1 | | 10/2013 | |

OTHER PUBLICATIONS

Perottoni et. al., "The Carbon analogues of type-I silicon clathrates", J. Phys.: Condens. Matter, 13, (2001), pp. 5981-5998.*

(Continued)

*Primary Examiner* — Khanh Tuan Nguyen
(74) *Attorney, Agent, or Firm* — Grossman, Tucker et al (57) ABSTRACT

A composition comprising a Type 1 clathrate of silicon having a $Si_{46}$ framework cage structure wherein the silicon atoms on said framework are at least partially substituted by carbon atoms, said composition represented by the formula $C_ySi_{46-y}$ with $1 \leq y \leq 45$. The composition of may include one or more guest atoms A within the cage structure represented by the formula $A_xC_ySi_{46-y}$ wherein A=H, Li, Na, K, Rb, Cs, Fr, Be, Mg, Ca. Sr, Ba, Ra, Eu, Cl, Br, or I or any metal or metalloid element and x is the number of said guest atoms within said cage structure.

17 Claims, 8 Drawing Sheets

(56) References Cited

U.S. PATENT DOCUMENTS

| | | | |
|---|---|---|---|
| 8,993,165 | B2 | 3/2015 | Miller et al. |
| 9,362,559 | B2 | 6/2016 | Chan |
| 2003/0197156 | A1 | 10/2003 | Eguchi et al. |
| 2008/0226836 | A1 | 9/2008 | Nolas et al. |
| 2010/0230632 | A1* | 9/2010 | Adamson et al. ......... 252/182.1 |
| 2011/0226299 | A1 | 9/2011 | Makansi |
| 2011/0253205 | A1 | 10/2011 | Grossman et al. |
| 2012/0021283 | A1* | 1/2012 | Chan .................... H01M 4/134 |
| | | | 429/218.1 |
| 2012/0295160 | A1 | 11/2012 | Miller et al. |
| 2013/0280609 | A1 | 10/2013 | Chan et al. |
| 2014/0302391 | A1 | 10/2014 | Miller et al. |
| 2015/0069309 | A1 | 3/2015 | Chan et al. |

OTHER PUBLICATIONS

U.S. Office Action issued May 12, 2014 in U.S. Appl. No. 12/842,224 (13 pgs).

Imai, et al, "Synthesis of a Si-clathrate Compound, Sr8GaxSi46-8, and Its Electrical Resistivity Measurements"; Journal of Alloys and compounds 335, 2002, pp. 270-276.

Tsujii, et al, "Phase Stability and Chemical Composition Dependence of the Thermoelectric Properties of the Type-I Clathrate Ba8AlxSi46-x (8≤x≤15)"; Journal of Solid State Chemistry 184, 2011, pp. 1293-1303.

Adams et al., Wide-band-gap Si in open fourfold-coordinated clathrate structures, The American Physical Society, Physical Review B, Mar. 15, 1994, pp. 8048-8053, vol. 49, No. 12.

Beattie et al., Si Electrodes for Li-Ion Batteries—A New Way to Look at an Old Problem, Journal of The Electrochemical Society, 2008, pp. A158-A163, vol. 155 (2).

Brooksbank et al., Tessellated Stresses Associated With Some Inclusions in Steel, Journal of the Iron and Steel Institute, Apr. 1969, pp. 474-483.

Chan et al., High-performance lithium battery anodes using silicon nanowires, nature nanotechnology—Letters, Jan. 2008, pp. 31-35, vol. 3.

Connetable et al., Superconductivity in Doped sp3 Semiconductors: The Case of the Clathrates, The American Physical Society—Physical Review Letters, Dec. 12, 2003, pp. 247001-1-247001-4, vol. 91, No. 24.

CPMD—Car-Parrinello Molecular Dynamics—Manual, An ab initio Electronic Structure and Molecular Dynamics Program, The CPMD consortium, Sep. 4, 2008, 258 pages.

Cui et al., Crystalline-Amorphous Core-Shell Silicon Nanowires for High Capacity and High Current Battery Electrodes, American Chemical Society—Nano Letters, Dec. 1, 2008, 5 pages.

Eom et al., Electrochemical Insertion of Lithium into Multiwalled Carbon Nanotube/Silicon Composites Produced by Ballmilling, Journal of the Electrochemical Society, 2006, pp. A1678-A1684, vol. 153 (9).

Graetz et al., Highly Reversible Lithium Storage in Nanostructured Silicon, Electrochemical and Solid-State Letters, 2003, A194-A197, vol. 6 (9).

Green et al., Structured Silicon Anodes for Lithium Battery Applications, Electrochemical and Solid-State Letters, 2003, A75-A79, vol. 6 (5).

Grovenstein, et al., "Cleavage of tetraalkylammonium halides by sodium in liquid ammonia" J. Am. Chem. Soc. 1959, 81, 4850-4857.

Huggins et al., Decrepitation Model for Capacity Loss During Cycling of Alloys in Rechargeable Electrochemical Systems, Ionics, 2000, 8 pages, vol. 6.

Kim et al., Three-Dimensional Porous Silicon Particles for Use in High-Performance Lithium Secondary Batteries, Angewandte Chemie—Anode Materials, 2008, pp. 10151-10154, vol. 47.

Lewis et al., In Situ AFM Measurements of the Expansion of Contraction of Amorphous Sn—Co—C Films Reacting with Lithium, Journal of the Electrochemical Society, 2007, pp. A213-A216, vol. 154 (3).

Manthiram, et al., "Low temperature synthesis of insertion oxides for lithium batteries." Chem. Mater. 1998, 10, 2895-2909.

Melinon et al., Phonon density of states of silicon clathrates: Characteristic width narrowing effect with respect to the diamond phase, The American Physical Society, Apr. 15, 1999, pp. 10 099-10 104, vol. 59, No. 15.

Miguel et al., A New Class of Low Compressibility Materials: Clathrates of Silicon and Related Materials, High Pressure Research, 2002, pp. 539-544, vol. 22.

Nakano, et al., "Soft xray photoelectron spectroscopy in silicon clathrate superconductors," SPring-8 Res Front 2001B/2002A, p. 51-53 (2003).

Ryu et al, Failure Modes of Silicon Powder Negative Electrode in Lithium Secondary Batteries, Electrochemical and Solid-State Letters, 2004, A306-A309, vol. 7 (10).

San-Miguel, et al., "High-pressure properties of group IV clathrates." High Pressure Research 2005, 25(3), 159-185.

Takamura et al., A vacuum deposited Si film having a Li extraction capacity over 2000 mAh/g with a long cycle life, Journal of Power Sources, 2004, pp. 96-100, vol. 129.

Timmons et al., In Situ Optical Observations of Particle Motion in Alloy Negative Electrodes for Li-Ion Batteries, Journal of the Electrochemical Society, 2006, pp. A1206-A1210, vol. 153 (6).

Timmons et al., Isotropic Volume Expansion of Particles of Amorphous Metallic Alloys in Composite Negative Electrodes for Li-Ion Batteries, Journal of the Electrochemical Society, 2007, pp. A444-A448, vol. 154 (5).

Wen et al., Chemical Diffusion in Intermediate Phases in the Lithium-Silicon System, Journal of Solid State Chemistry, 1981, pp. 271-278, vol. 37.

Yang et al., Small particle size multiphase Li-alloy anodes for lithium-ion-batteries, Solid State Ionics, 1996, pp. 281-287, vol. 90.

Yoshio, et al, "Lithium-Ion Batteries, Science and Technologies", 2009 Springer ISBN: 978-0-387-34444-7, e-ISBN: 978-0-387-34445-4, DOI: 10,1007/978-0-387-34445-4.

Zhang et al., Composite anode material of silicon/graphite/carbon nanotubes for Li-ion batteries, Electrochimica Acta, 2006, pp. 4994-5000, vol. 51.

Zhang et al., Pyrolytic carbon-coated silicon/Carbon Nanotube composites: promising application for Li-ion batteries, Int. J. Nanomanufacturing, 2008, pp. 4-15, vol. 2, Nos. 1/2.

International Search Report and Written Opinion of the ISA/KR (12 pgs); mail date Jun. 25, 2013; issued in related matter PCT/US2013/032430.

U.S. Office Action issued Mar. 19, 2013 in U.S. Appl. No. 12/842,224 (10 pgs).

U.S. Office Action issued Oct. 31, 2013 in U.S. Appl. No. 12/842,224 (12 pgs).

U.S. Office Action issued Jun. 26, 2013 in U.S. Appl. No. 13/109,704 (16 pgs).

U.S. Office Action issued Mar. 27, 2014 in U.S. Appl. No. 13/452,403 (15 pgs).

U.S. Office Action issued Jul. 28, 2015 in U.S. Appl. No. 14/022,822 (11 pgs).

Blase, et al, "Structural, Mechanical and Superconducting Properties of Clathrates", Computer-Based Modeling of Novel Carbon Systems and Their Properties, Carbon Materials: Chemistry and Physics 3, Chapter 6, pp. 171-206, 2010).

* cited by examiner

HYBRID SILICON AND CARBON CLATHRATES

FIELD OF THE INVENTION

The present invention relates to the composition and synthesis of clathrate compounds with a silicon and carbon framework. More specifically, Type I clathrates of silicon and carbon are disclosed with or without guest atoms. These compounds may be suitable for use as thermoelectric materials, electronic materials, and energy storage materials.

BACKGROUND

Figure 1:
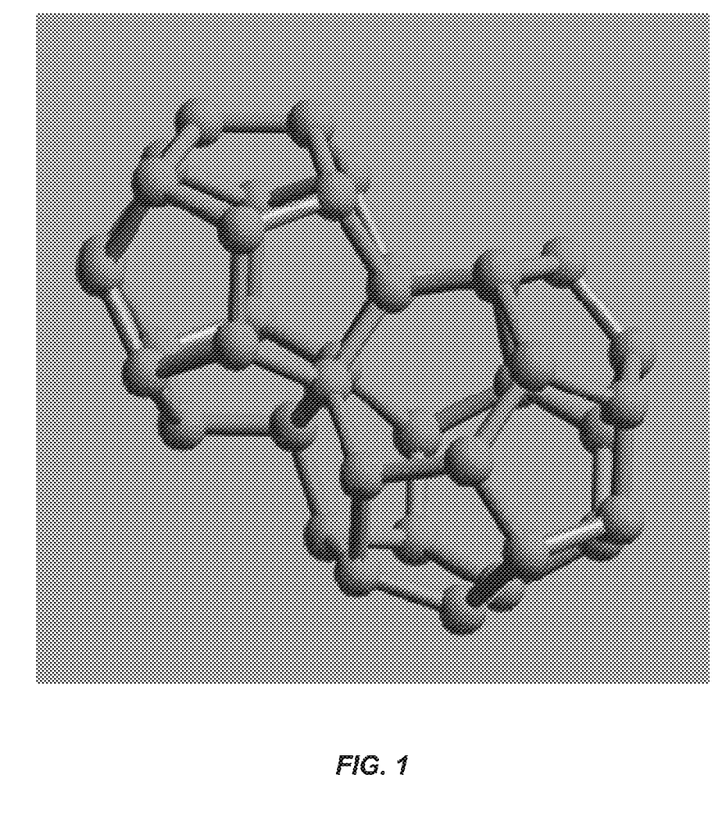
FIG. 1 illustrates $Si_{20}$ and $Si_{24}$ cages as the building of the representative $Si_{46}$ clathrate.

Silicon clathrate $Si_{46}$ refers to crystalline Si with a regular arrangement of 20-atom and 24-atom cages fused together through 5 atom pentagonal rings (Type I clathrate). It has a simple cubic structure with a lattice parameter of 10.335 Å and 46 Si atoms per unit cell. FIG. 1 illustrates the cage structure of the $Si_{46}$, which belongs to the Space Group Pm$\bar{3}$n and Space Group Number 223. The crystal structure of the silicon clathrate ($Si_{46}$) is different from the common form of crystalline Si (c-Si), which is diamond cubic with a lattice parameter of about 5.456 Å and belongs to the Space Group Fd$\bar{3}$m, Number 227.

Another form of silicon clathrate is $Si_{34}$ (Type II clathrate) that consists of crystalline Si with a regular arrangement of 20 atoms and 28 atom cages fused together through five-atom pentagonal rings. Type II $Si_{34}$ clathrate has a face-centered cubic (fcc) structure, with 34 Si atoms per fcc unit cell. The $Si_{34}$ clathrate has a lattice parameter of 14.62 Å and belongs to the Space Group Fd$\bar{3}$m, Number 227. Type II silicon clathrate is sometimes referred to as $Si_{136}$ since the compound contains four fcc unit cells. A third form of silicon clathrate is a modification of the $Si_{46}$ type formed by removing four atoms from the 24-atom cages.

SUMMARY

A composition comprising a Type 1 clathrate of silicon having a $Si_{46}$ framework cage structure wherein the silicon atoms on the framework are at least partially substituted by carbon atoms and wherein the composition may be represented by the formula $C_ySi_{46-y}$ with $1 \leq y \leq 45$. The cage structure may include guest atoms, in which case the composition may be represented by the formula $A_xC_ySi_{46-y}$ with $1 \leq y \leq 45$ and wherein A is a guest atom in the cage structure and x is the number of guest atoms in the cage wherein x has a value such that the cage structure undergoes a volume expansion of less than or equal to 50.0%.

BRIEF DESCRIPTION OF THE DRAWINGS

The detailed description below may be better understood with reference to the accompanying figures which are provided for illustrative purposes and are not to be considered as limiting any aspect of the invention.

DETAILED DESCRIPTION

Theoretical computations have shown that both Type I carbon clathrate ($C_{46}$) and Type II carbon clathrate ($C_{136}$ or $C_{34}$) may exist as metastable phases under high pressures. Insertion of guest atoms such as Li, Na, or Ba into the cage structures may also be feasible under high pressures. However, the energy of formation for the Type I and Type II carbon clathrates are extremely high and syntheses of neither Type I nor Type II carbon clathrates have been reported.

Figure 2:
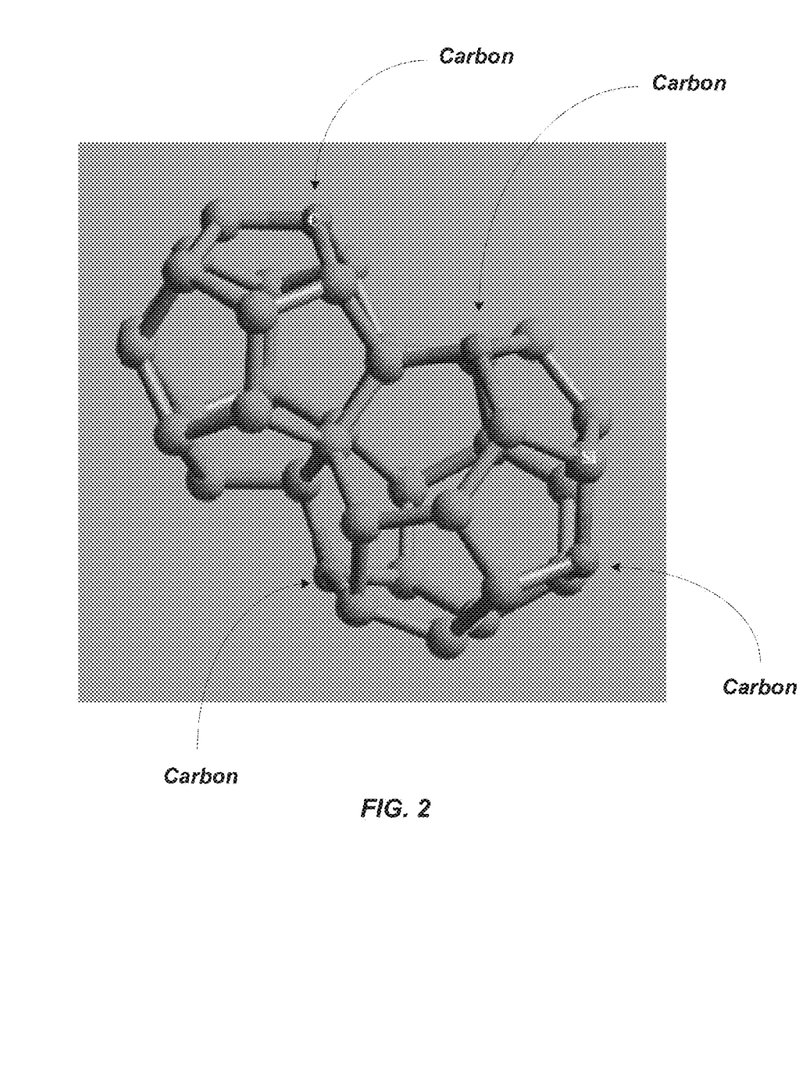
FIG. 2 illustrates a Type I $C_ySi_{46-y}$ clathrate where y is greater than or equal to 1 and less than or equal to 45.

Computational studies were therefore initially undertaken on the Type I clathrate allotropes of silicon which revealed that the silicon atoms on the $Si_{46}$ framework of the cage structure can be partially substituted by carbon atoms to form a hybrid silicon-carbon clathrate, which can be represented by the chemical formula $C_ySi_{46-y}$. FIG. 2 shows a representation of the Type I $C_ySi_{46-y}$ clathrates, wherein y is greater than or equal to 1 and less than or equal to 45 ($1 \leq y \leq 45$). For example, y may have a value of 4-40. The arrows in FIG. 2 identify possible placement of the four identified carbon atoms.

Furthermore, guest atoms can be inserted into the cage structure to stabilize the hybrid silicon carbon clathrate by reducing the energy of formation n to form a class of new hybrid silicon and carbon clathrates, represented as $A_xC_ySi_{46-y}$. In this situation y is again greater than equal to 1 and less than or equal to 45 ($1 \leq y \leq 45$) and A=H, Li, Na, K, Rb, Cs, Fr, Be, Mg, Ca. Sr, Ba, Ra, Eu, Cl Br and I and any metal or metalloid element capable of occupying the empty spaces inside the cage of the Type 1 clathrate structure. Metals may therefore include any one of alkali metals, alkaline earth metals, transition metals, post-transition metals or lathanoids. Metalloids may include B, Si, Ge, As, Sb or Te.

The value of x in the above formula $A_xC_ySi_{46-y}$ corresponds to the number of guest atoms A residing in the cage. The number of guest atoms, x, that can occupy inside the cage structure will depend on the atomic size of A. For relatively large atoms such as Ba, which has an atomic radius of 222 picometers, the number of Ba atoms intercalated within the cage structure is preferably eight or less ($0 \leq x \leq 8$). For relatively small atoms such as Li, which has an atomic radius of 152 picometers, the number of Li atoms, x, intercalated within the cage structures will depend on the specific form and stoichiometric ratio of C and Si. Ultimately the value of x for any guest atom "A" is limited to a value defined by the onset of significant expansion of the lattice parameter, beyond which irreversible structural damage occurs in the bulk material. It should be noted that while one may determine a theoretical capacity of guest atoms before one would expect expansion (e.g., in the case of Ba a theoretical capacity of around 8 and in the case of Li a theoretical capacity of around 23), it has been observed that one may exceed the theoretical capacity depending upon the observed elasticity of the cage ($C_ySi_{46-y}$). Accordingly, irreversible structural damage may occur beyond the theoretical capacity of any given guest atom and may be determined experimentally.

It may be appreciated therefore that the clathrate structure defined by the equation $A_xC_ySi_{46-y}$ may be understood as one that, upon intercalcation of a guest atom A, the value of x is selected such that the cage structure will preferably undergo a volume expansion of less than or equal to 50.0%, or in the range of 0.1% to 50.0% at 0.1% increments. In related context, the C—Si clathrate structures herein are such that upon deintercalcation, preferably undergo a volume change (contraction) of 50.0% or less, or in the range of 0.1% to 50.0% at 0.1% increments.

Figure 3:
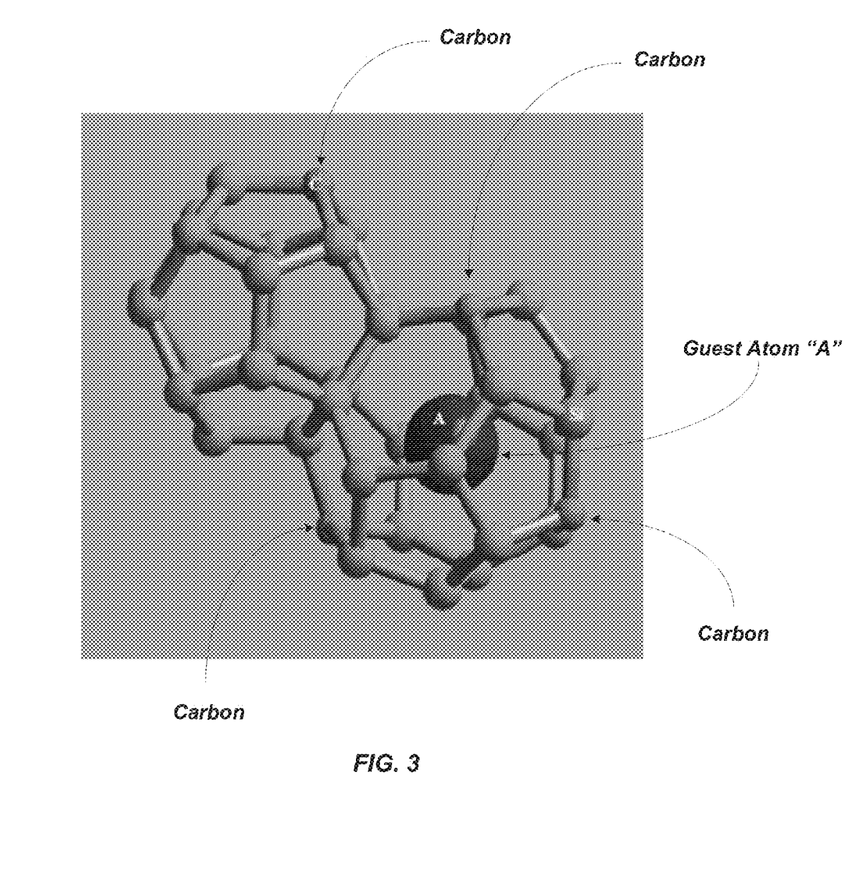
FIG. 3 is a structural representation of a possible Type I $A_xC_ySi_{46-y}$ clathrate compound.
Figure 4:
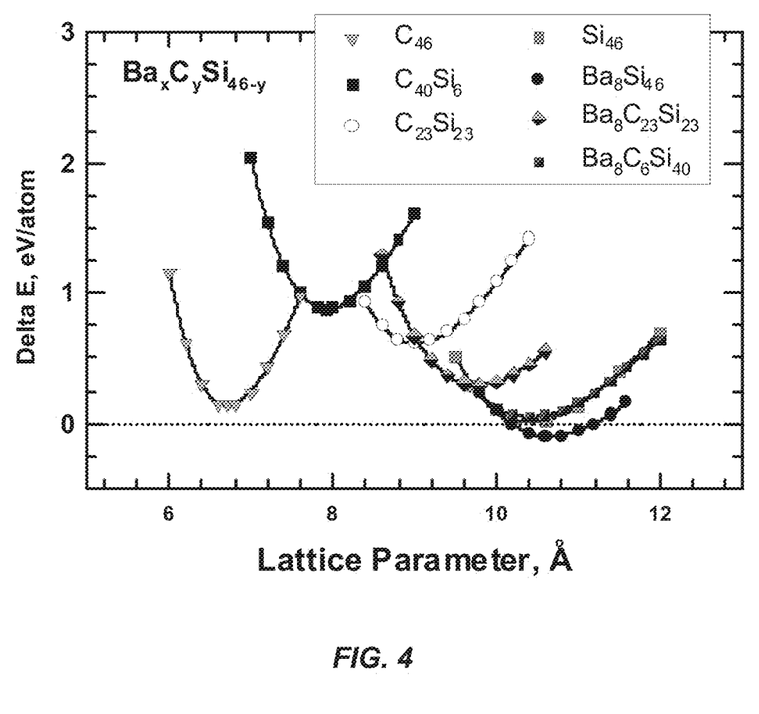
FIG. 4 illustrates the computed values of the energy change of formation (Delta E) per atom for the identified structures.

FIG. 3 shows a structural representation of a possible Type I $A_xC_ySi_{46-y}$ clathrate compound with four carbon atoms and the single guest atom "A" as indicated. The computed values of the energy change of formation per atom for representative $Ba_8C_ySi_{46-y}$, $C_{46}$, $C_{40}Si_6$, and $C_{23}Si_{23}$ clathrates are compared with those for $Si_{46}$ and $Ba_8Si_{46}$ in FIG. 4. The positive values for the energy of formation at the minima of the energy change curves indicate that these $Ba_8C_ySi_{46-y}$ clathrate compounds are metastable.

Figure 5:
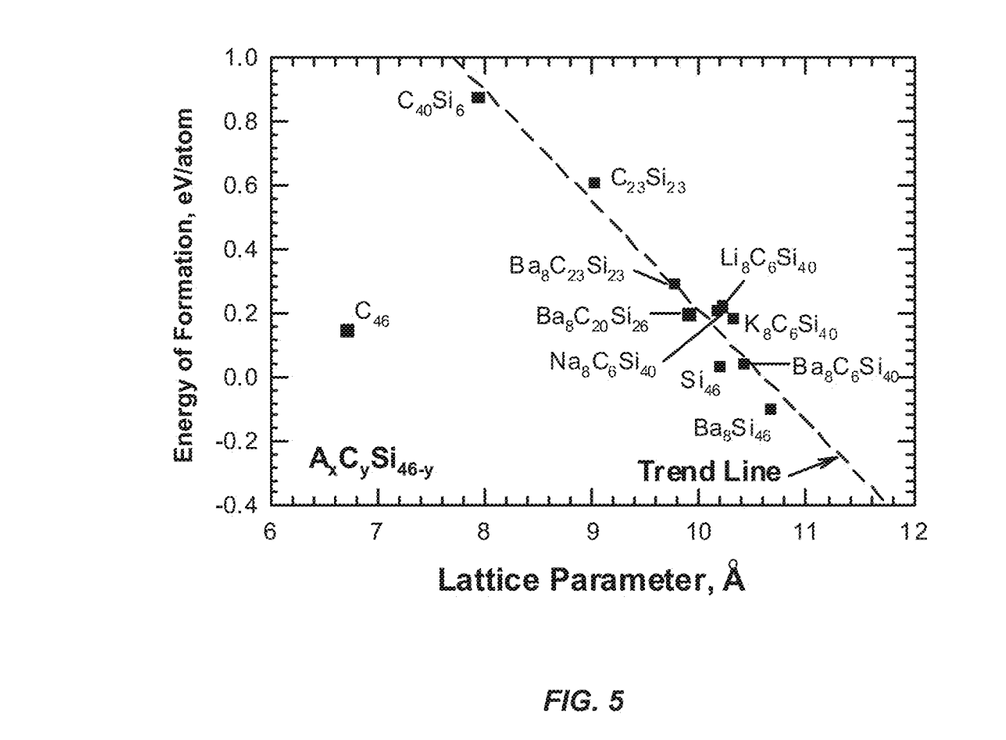
FIG. 5 provides the computed values of energy of formation for a number of Type I $A_xC_ySi_{46-y}$ clathrates as compared against those of $C_{46}$, $Si_{46}$, and $Ba_8Si_{46}$.

FIG. 5 provides the computed values of the energy of formation for a number of Type I $A_xC_ySi_{46-y}$ clathrates as compared against those of $C_{46}$, $Si_{46}$, and $Ba_8Si_{46}$. The comparison shows that value of the energy of formation for $C_ySi_{46-y}$ and $A_xC_ySi_{46-y}$ is positive and it generally increases with decreasing values of the lattice parameter.

Accordingly, the hybrid silicon and carbon clathrate disclosed herein is preferably obtained by substituting some silicon atoms on the Type I silicon clathate framework, $Si_{46}$, with carbon atoms to produce a silicon-carbon framework that is represented by $C_ySi_{46-y}$ and consists of y carbon atoms and 46-y silicon atoms with a regular arrangement of 20-atom and 24-atom cages fused together through 5 atom pentagonal rings (Type I clathrate). It has a simple cubic structure with a lattice parameter in the range of 6.72 Å to 11.20 Å and a combined sum of 46 Si and C atoms per unit cell. Like $Si_{46}$, the crystal structure of the $C_ySi_{46-y}$ clathrate belongs to the Space Group Pm$\bar{3}$n, Number 223.

The hybrid silicon carbon clathrate allotropes described herein may be preferably prepared via an arc melt technique, which has been employed in connection with the preparation of metallic and refractory alloys. Such preparation may be represented by the following:

$$xBa = ySiC + (46 - 2y)Si \xrightarrow{\Delta} Ba_xC_ySi_{46-y}$$

In the above equation, $\Delta$ denotes the energy (heat and electrical) delivered to the powdered admixture, and x=1-8 and y=6-23.

Representative examples are identified below. In either case, the introduction or replacement of guest atoms, for example replacement of Ba with Li atoms, may be afforded through the methods described in U.S. application Ser. No. 13/109,704, whose teachings are incorporated by reference. Representative examples therefore include, but are not limited to, $Ba_xC_6Si_{40}$, $Ba_xC_{16}Si_{30}$, $Ba_xC_{20}Si_{26}$, $Ba_xC_{23}Si_{23}$, $Li_xC_6Si_{40}$, $Li_xC_{16}Si_{30}$, $Li_xC_{20}Si_{26}$, $Li_xC_{23}Si_{23}$, or similar permutations of C and Si.

Figure 6:
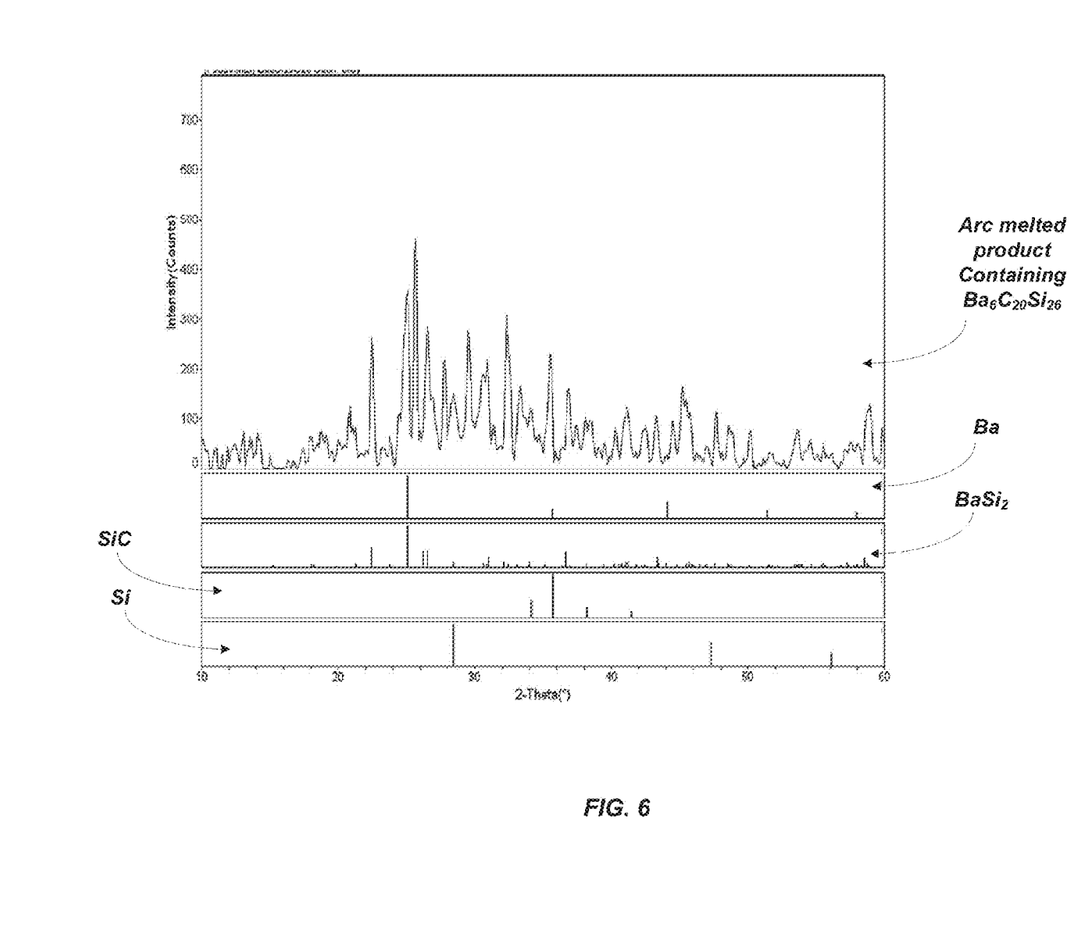
FIG. 6 shows powder XRD data of the indicated arc-melted product containing $Ba_6C_{20}Si_{26}$.

Accordingly, in the present invention, $Ba_8C_{20}Si_{26}$ has been synthesized by arc-melting appropriate amounts of Ba, SiC, and Si as the starting materials. Admixtures of Ba, Si, and SiC (in the proportion of 106.2 g Ba, 16.29 g of Si, and 77.52 g of SiC powders) was arc-melted to provide 200 grams of product, containing $Ba_6C_{20}Si_{26}$ plus some amounts of unreacted starting materials. Powder x-ray diffraction (XRD) data of the arc-melted product (i.e., not purified) containing $Ba_6C_{20}Si_{26}$ is presented in FIG. 6. Some of the reflection peaks in the XRD spectra, as illustrated, correspond to unreacted Ba, SiC, and Si starting materials, as well as some $BaSi_2$. However, the remaining reflections in the XRD spectra do not belong to Ba, Si, $BaSi_2$, and Si, and have been assigned to the $Ba_6C_{20}Si_{26}$ clathrate structure of the present invention. These assignments are corroborated by additional analysis for compound identification, which follows.

Figure 7:
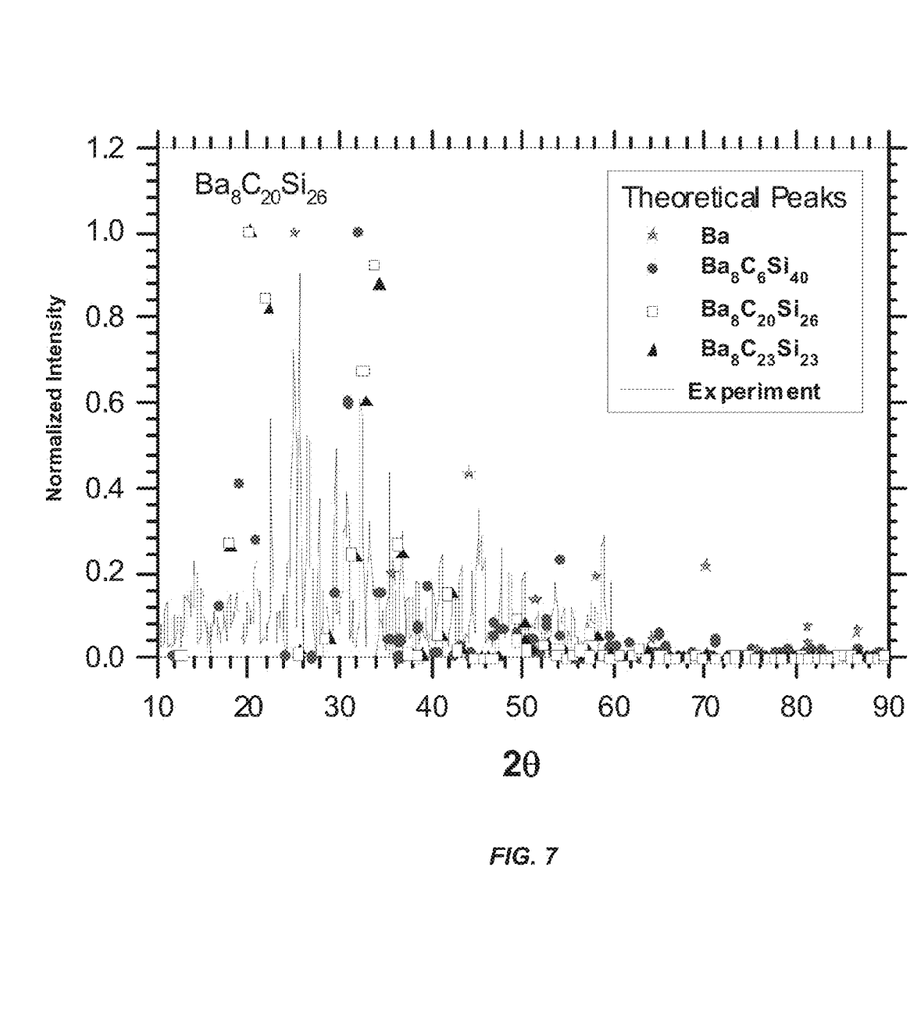
FIG. 7 shows powder XRD measured for $Ba_8C_{20}Si_{26}$ minus those of SiC and Si compared with those of Ba and the theoretical spectra of Type I clathrate structure of $Ba_8C_6Si_{40}$, $Ba_8C_{20}Si_{26}$, and $Ba_8C_{23}Si_{23}$ as well as those of Ba.

Further analysis of the XRD results was carried out by subtracting the SiC and Si reflection peaks from the $Ba_8C_{20}Si_{26}$ spectra. The remaining reflection peaks were then compared with the theoretical-computed XRD spectra for Type I clathrate structure of $Ba_8C_6Si_{40}$, $Ba_8C_{20}Si_{26}$, and $Ba_8C_{23}Si_{23}$ as well as those of Ba. These comparisons are presented in FIG. 7. The theoretically-computed reflections for $Ba_8C_6Si_{40}$, $Ba_8C_{20}Si_{26}$ and $Ba_8C_{23}Si_{23}$ were obtained by first optimizing the Type I clathrate structures using first principles Car-Parrinello Molecular Dynamics (CPMD) computations to derive the equilibrium crystallographic parameters, followed by computing the corresponding reflections in the XRD spectrum using the analysis and visualization software called Diamond. The comparison indicates that a Type I clathrate compound is present in the arc-melted $Ba_8C_{20}Si_{26}$ product. The crystal structure of this clathrate compound is close to those of $Ba_8C_6Si_{40}$, $Ba_8C_{20}Si_{26}$, and $Ba_8C_{23}Si_{23}$ based on the characteristic reflections at 2θ of 18°, 21°, 30°, and 32° for the silicon carbon clathrates.

Figure 8:
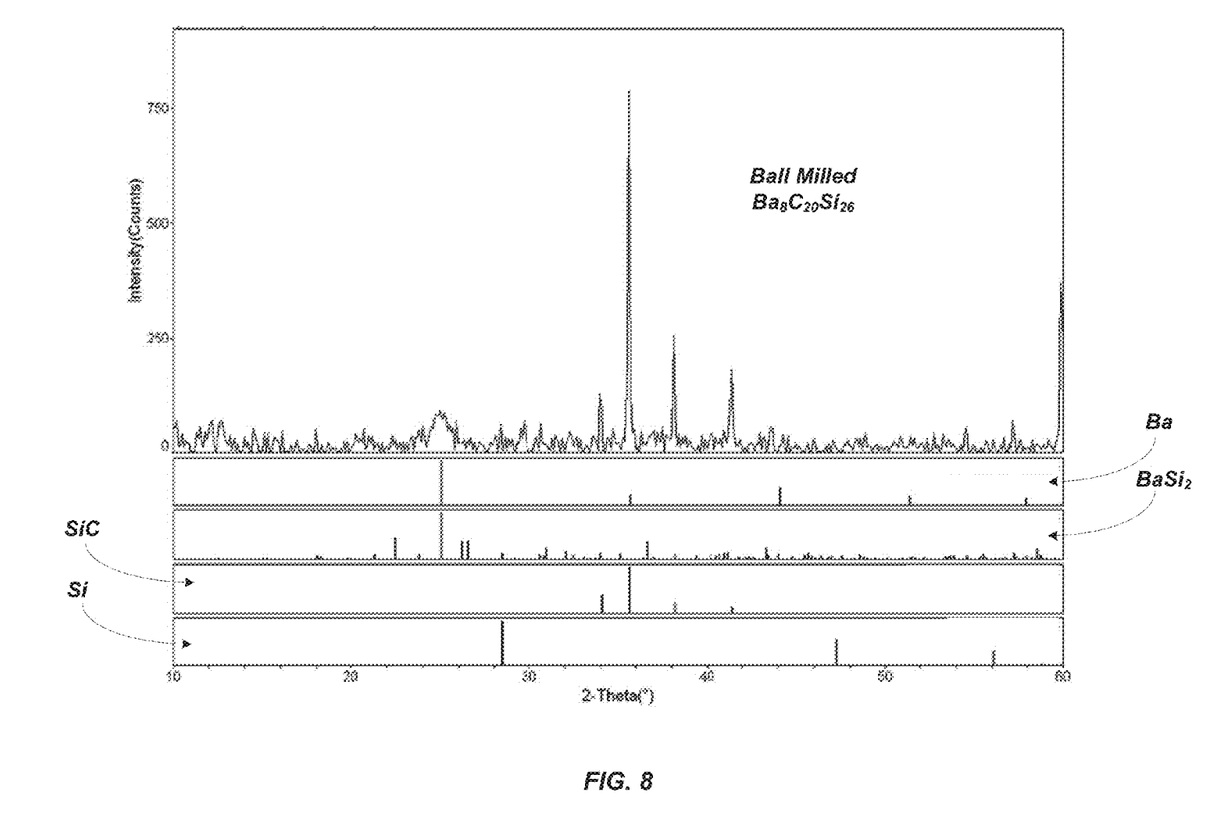
FIG. 8 shows powder XRD measured for ball milled $Ba_8C_{20}Si_{26}$ after arc-melting of powdered admixture of Ba, SiC and Si.

Some of the as-synthesized $Ba_8C_{20}Si_{26}$ materials were ball-milled into finer powders and subsequently characterized by powder XRD. FIG. 8 presents the XRD spectrum observed in the ball-milled materials, which indicates the presence of Ba, $BaSi_2$, SiC, and Si in the reflection patterns for the ball-milled $Ba_8C_{20}Si_{26}$ powders. The characteristic reflections for Type I clathrate at 2θ of 18°, 21°, 30°, and 32° have all disappeared and have been replaced by those corresponding to $BaSi_2$ in the ball-milled materials. The results indicate that the Type I clathrate material in the as-synthesized $Ba_8C_{20}Si_{26}$ is metastable, and it can be made to transform to the lower energy compound $BaSi_2$ by the action of ball-milling. This finding is consistent with the first-principles computations shown in FIG. 4 and FIG. 5, which show that $Ba_8C_6Si_{40}$, $Ba_8C_{20}Si_{26}$, and $Ba_8C_{23}Si_{23}$ are metastable compounds with positive energies of formation. Among the three compounds, $Ba_8C_6Si_{40}$ has the lowest relative energy of formation, followed by $Ba_8C_{20}Si_{26}$, and $Ba_8C_{23}Si_{23}$. It is therefore contemplated herein that the finding that $Ba_8C_{20}Si_{26}$ can be synthesized by arc-melting using SiC as the starting material suggests that the technique may be employed for the synthesis of other hybrid silicon and carbon clathrates, such as $Ba_8C_6Si_{40}$ and $Ba_8C_{23}Si_{23}$.

In accordance with all of the above, the present invention identifies beneficial attributes and utility for Type I clathrates of silicon and carbon with or without guest atoms. In such compositions, the band structure and, in particular, the electrochemical work function of the alloy clathrates may be tuned by either altering the number of carbon atoms on the hybrid silicon and carbon framework or by altering the guest atoms inserted into the cage structure of clathrate system. These electronic characteristics make this class of Type I clathrates suitable for applications as thermoelectric, electronic, and energy storage materials.

The identified hybrid carbon and Si framework may lead to delocalization of the band structure, reduce the band gap and increase the electronic conductivity of the clathrate compound. The presence of carbon atoms on the clathrate framework can result in a relatively smaller lattice constant and relatively less empty space in the cage structure so that there is more electronic interaction between the guest atom and the Si and C atoms on the surrounding framework. It is contemplated that these interactions can be tuned to enhance the Seebeck effects and electronic conductivity, alter the band gap, and reduce the thermal conductivity by adjusting the number of carbon atoms on the framework, as well as the size and type of guest atoms inside the cage structure. For applications as energy storage materials, the band structure and, in particular, the electrochemical work function of the anode and cathode for combinations of electrodes with unique clathrate-alloy compositions may be tuned to be compatible with the rest of the battery system, including the absolute energies of the highest occupied molecular orbital (HOMO) and the lowest unoccupied molecular orbital (LUMO) of the electrolyte.

This tunability of the anode and cathode may be accomplished by adjusting the stoichiometric ratios of Si/C such that a desirable open-circuit potential is obtained in the charged state of the battery within a thermodynamically-stable energy range of the electrolyte. Thus, using appropriate ratios and/or elemental forms of Si/C framework atoms may yield a small work function necessary for the clathrate-alloy composition to function as an anode, whereas different ratios and/or elemental form of Si/C framework atoms may be used to yield a large work function necessary for the silicon-carbon clathrate-alloy composition to function as a cathode. The battery couple (anode+cathode) that results is therefore based on a single class of material chemistry, though with unique ratios and elemental forms of Si/C framework atoms.

Accordingly, it may be appreciated that the Type 1 silicon-carbon clathrate alloy herein of the formula $C_ySi_{46-y}$ with $1 \leq y \leq 45$, or the silicon-clathrate alloy herein of the formula $A_xC_ySi_{46-y}$ with $1 \leq y \leq 45$ and A comprising A=H, Li, Na, K, Rb, Cs, Fr, Be, Mg, Ca, Sr, Ba, Ra, Eu, Cl Br and I and any metal or metalloid element capable of occupying the empty spaces inside the cage of the Type 1 clathrate structure, may be configured such that they have one or more of the following characteristics: (1) be of particle form having a largest linear dimension of 0.1 μm to 100.0 μm; (2) be of electrode form wherein the electrode comprises a metal substrate and the clathrate alloy structure is present on the surface of the metal substrate; (3) be of the formula $A_xC_ySi_{46-y}$ wherein A is Li; (4) be of anode electrode form in a Li battery; (5) be of cathode electrode form in a Li battery. Reference to a Li-battery may be understood as a rechargeable battery in which lithium ions move from a negative electrode to a positive electrode during discharge and back when charging. During discharge lithium ions Li+ carry current from the negative to the positive electrode through a non-aqueous electrolyte and separator diaphragm.

What is claimed is:

1. An electrode for a battery wherein said electrode comprises a type 1 clathrate of silicon at a particle size of 0.1 μm to 100.0 μm having a $Si_{46}$ framework cage structure wherein the silicon atoms on said framework are at least partially substituted by carbon atoms, said composition represented by the formula $C_ySi_{46-y}$ with $1 \leq y \leq 45$, wherein said electrode comprises a metal substrate and said type 1 clathrate particles are present on the surface of said metal substrate, further including one or more guest atoms A within said cage structure, represented by the formula $A_xC_ySi_{46-y}$ wherein A=H, Li, K, Na, Rb, Cs, Fr, Be, Mg, Ca, Sr, Ba, Ra, Eu, Cl, Br, or I or any metal or metalloid element and x is the number of said guest atoms within said cage structure and wherein x is greater than zero and has a value such that the cage structure due to the presence of said guest atom undergoes a volume expansion of 0.1% to 50.0% and said volume expansion does not lead to irreversible structural damage to said framework cage structure characterized by a volume contraction in the range of 0.1% to 50.0% upon removal of said guest atom.

2. The electrode of claim 1 wherein y has a value of 4-40.

3. The electrode of claim 1 wherein said electrode comprises an anode electrode in a Li battery.

4. The electrode of claim 1 wherein said electrode comprises a cathode electrode in a Li battery.

5. The electrode of claim 1 wherein x is less than or equal to 8.

6. The electrode of claim 1 where A is Li.

7. The electrode of claim 1 wherein said type 1 clathrate comprises $Ba_xC_6Si_{40}$.

8. The electrode of claim 1 wherein said type 1 clathrate comprises $Ba_xC_{16}Si_{30}$.

9. The electrode of claim 1 wherein said type 1 clathrate comprises $Ba_xC_{20}Si_{26}$.

10. The electrode of claim 1 wherein said type 1 clathrate comprises $Ba_xC_{23}Si_{23}$.

11. The electrode of claim 1 wherein said type 1 clathrate comprises $Li_xC_6Si_{40}$.

12. The electrode of claim 1 wherein said type 1 clathrate comprises $Li_xC_{16}Si_{40}$.

13. The electrode of claim 1 wherein said type 1 clathrate comprises $Li_xC_{20}Si_{26}$.

14. The electrode of claim 1 wherein said type 1 clathrate comprises $Li_xC_{23}Si_{23}$.

15. The electrode of claim 1 wherein said type 1 clathrate comprises $Ba_8C_6Si_{40}$.

16. The electrode of claim 1 wherein said type 1 clathrate comprises $Ba_8C_{20}Si_{26}$.

17. The electrode of claim 1 wherein said type 1 clathrate comprises $Ba_8C_{23}Si_{23}$.

* * * * *